United States Patent
Ebert et al.

[11] Patent Number: 6,126,160
[45] Date of Patent: Oct. 3, 2000

[54] SHEET FEEDING CONTROL FOR IMAGE READING DEVICE

[75] Inventors: Thomas W. Ebert, Penfield; Robert M. Westcott, Holley; Randall R. Maysick, Churchville, all of N.Y.

[73] Assignee: Eastman Kodak Company, Rochester, N.Y.

[21] Appl. No.: 09/290,118

[22] Filed: Apr. 12, 1999

[51] Int. Cl.⁷ .................................................. B65H 5/00
[52] U.S. Cl. ................. 271/10.03; 271/111; 271/265.02
[58] Field of Search ............................... 271/10.03, 4.03, 271/110, 111, 265.02, 265.01

[56] References Cited

U.S. PATENT DOCUMENTS

| | | |
|---|---|---|
| 3,936,041 | 2/1976 | Shiina et al. . |
| 4,057,341 | 11/1977 | Sohm . |
| 4,317,138 | 2/1982 | Bryan et al. . |
| 4,318,540 | 3/1982 | Paananen et al. . |
| 4,440,487 | 4/1984 | Miura . |
| 4,451,027 | 5/1984 | Alper . |
| 4,541,624 | 9/1985 | Sasage et al. ............................ 271/110 |
| 4,541,713 | 9/1985 | Maekawa . |
| 4,825,248 | 4/1989 | Honjo et al. . |
| 4,926,270 | 5/1990 | Sakamoto . |
| 4,956,651 | 9/1990 | Emori . |
| 4,972,235 | 11/1990 | Iwamoto et al. . |
| 4,996,568 | 2/1991 | Hamakawa . |
| 5,008,709 | 4/1991 | Shinada et al. . |
| 5,018,716 | 5/1991 | Yoshida et al. . |
| 5,056,771 | 10/1991 | Beck et al. . |
| 5,112,038 | 5/1992 | Dunaway . |
| 5,116,035 | 5/1992 | Russell et al. ............................ 271/3.1 |
| 5,121,169 | 6/1992 | Kawabata . |
| 5,164,846 | 11/1992 | Kim . |
| 5,181,705 | 1/1993 | ueda et al. . |
| 5,197,723 | 3/1993 | Yamada et al. . |
| 5,216,526 | 6/1993 | Ju . |
| 5,278,622 | 1/1994 | Segawa . |
| 5,290,021 | 3/1994 | Murooka et al. . |
| 5,295,667 | 3/1994 | Hutner . |
| 5,323,219 | 6/1994 | Hamanaka et al. . |
| 5,332,205 | 7/1994 | Chung et al. . |
| 5,333,043 | 7/1994 | Yamada . |
| 5,401,012 | 3/1995 | Taruki . |
| 5,423,527 | 6/1995 | Tranquilla . |
| 5,444,555 | 8/1995 | Ono . |
| 5,461,468 | 10/1995 | Dempsey et al. ........................ 271/259 |
| 5,471,290 | 11/1995 | Nagayama et al. . |
| 5,482,265 | 1/1996 | Nakazato et al. . |
| 5,520,383 | 5/1996 | Amagai et al. . |
| 5,532,809 | 7/1996 | Hamanaka et al. . |
| 5,557,391 | 9/1996 | Kato et al. . |
| 5,575,466 | 11/1996 | Tranquilla . |
| 5,596,399 | 1/1997 | Dempsey et al. .................. 271/265.02 |
| 5,629,763 | 5/1997 | Isobe et al. . |
| 5,671,917 | 9/1997 | Choho et al. . |
| 5,692,742 | 12/1997 | Tranquilla . |
| 5,699,165 | 12/1997 | Suzuki et al. . |
| 5,749,569 | 5/1998 | Atsumi et al. . |
| 5,775,683 | 7/1998 | Rodi . |
| 5,797,080 | 8/1998 | Okamoto . |
| 5,847,405 | 12/1998 | Acquaviva et al. .................. 250/559.3 |
| 5,921,539 | 7/1999 | Westcott et al. ..................... 271/10.03 |

*Primary Examiner*—H. Grant Skaggs
*Attorney, Agent, or Firm*—David A. Novais

[57] ABSTRACT

The present invention relates an image reading device and a sheet feeding method for feeding sheets or documents to the image reading device. In the device and method of the present invention, a controller which is associated with at least one of a sheet feeder or a feed sensor, controls an engagement and disengagement of the sheet feeder based on a comparison of a length of a first document fed into the image reading device with subsequent documents. With the device of the present invention, it is possible to increase document throughput rates by controlling the gap between documents.

7 Claims, 3 Drawing Sheets

SHEET FEEDING CONTROL FOR IMAGE READING DEVICE

CROSS REFERENCE TO RELATED APPLICATIONS

The present application is related to U.S. patent application Ser. No. 08/825,037 filed Mar. 26, 1997, by Robert Westcott, William Greene, Randall Maysick and Steven Moore entitled SHEET FEEDING DEVICE and now U.S. Pat. No. 5,921,539.

FIELD OF THE INVENTION

The present invention relates to an image reading device and a sheet feeding method for feeding sheets to the image reading device. More specifically, the present invention relates to a system and process which can be utilized to increase sheet or document throughput rate by controlling the feeding of sheets into an image reading device, and decreasing the length of a gap between documents or sheets fed into the image reading device.

BACKGROUND OF THE INVENTION

Image reading devices such as copier and scanners need to be designed to provide for high speed document transport. However, existing designs limit how quickly copiers and scanners operate. For example, conventional mechanical components which are involved in the feeding of documents tend to wear over time and accordingly, adversely influence the operation of copiers and scanners with respect to document throughput rates. Also, in order to increase the document throughput rates, it is necessary to increase transport speeds. However, increasing transport speeds can lead to errors in the processing of documents.

SUMMARY OF THE INVENTION

The present invention provides for a device and method which increases document throughput rates without increasing transport speed by controlling a feeding of documents and changing or controlling the length of the inter-document gap. In the system and method of the present invention, an algorithm which utilizes readings from sensors and timers in a document travel path can be utilized to control sheet feeding and gaps between documents. Further, in the system and method of the present invention, sheet feeding can be controlled based on comparative lengths of fed sheets.

The present invention relates to an image reading device which comprises a sheet feeder for feeding a document to be read into a document travel path; a feeder sensor located in the document travel path which senses a lead edge and a trail edge of a first document in the travel path to determine a length of the first document; and a controller operationally associated with at least one of the sheet feeder and the feeder sensor. The controller controls an engagement and disengagement of the sheet feeder based on a length of subsequent documents introduced into the document travel path with respect to the first document.

The present invention further relates to a sheet feeding method which comprises the steps of feeding a first sheet into a document travel path of an image reading device; sensing a leading edge and a trailing edge of a first sheet; determining a length of the first sheet based on the step of sensing the leading and trailing edges of the first sheet; and controlling a feeding of subsequent sheets based on a length of the subsequent sheets with respect to the length of the first sheet.

The present invention further relates to a sheet feeding method which comprises the steps of feeding a first sheet by a sheet feeder into a document travel path of an image reading device; sensing a leading edge of the first sheet by a first sensor; sensing a leading edge of the first sheet downstream of the first sensor by a second sensor and disengaging the sheet feeder in response thereto; engaging the sheet feeder and calculating a length of the first sheet when a trailing edge of the first sheet is sensed by the first sensor, such that a length of the first sheet is used as a basis for an overlength threshold for subsequent sheets; feeding a second sheet by the sheet feeder into the document travel path and starting a sheet overlength timer based on the overlength threshold when a leading edge of the second sheet is sensed by the first sensor, with the second sheet being fed in a fixed gap mode in which a fixed gap is provide between subsequently fed sheets; disengaging the sheet feeder and starting a sheet feeder timer when the leading edge of the second sheet reaches the second sensor; determining if the sheet feeder timer has expired, such that if the sheet feeder timer has expired, the second sheet is longer or the same length as the first sheet and the method comprises the further step of engaging the sheet feeder; and determining if the overlength timer has expired, such that if the overlength timer has expired, the second sheet is longer than the first sheet and the method comprises the further steps of disabling the fixed gap mode, disengaging the sheet feeder and engaging the sheet feeder when a trailing edge of the second document is sensed by the first sensor.

DETAILED DESCRIPTION OF THE INVENTION

Figure 1:
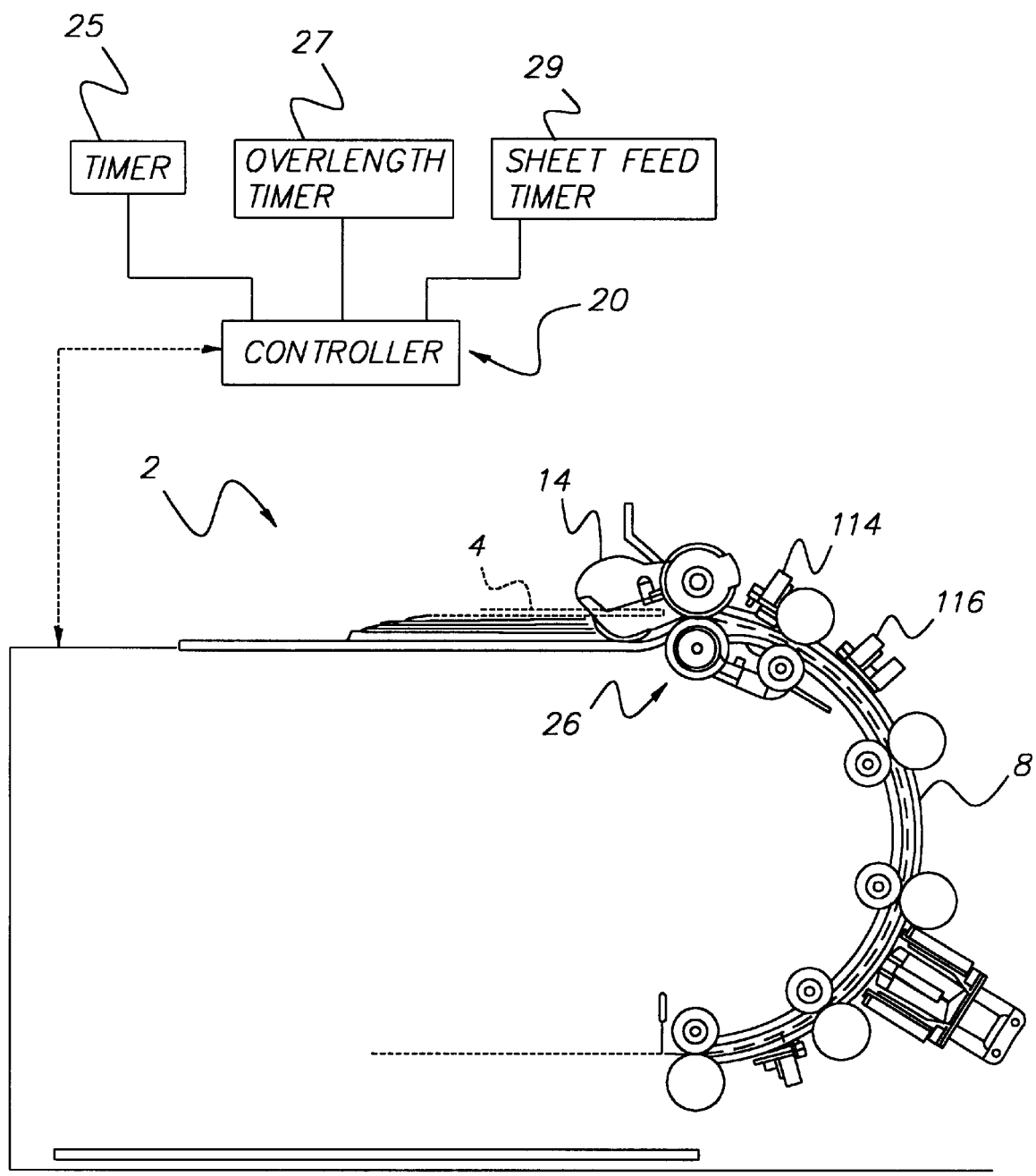
FIG. 1 is a cross-sectional view of a sheet feeder of an image reading device in accordance with the present invention.

Referring now to the drawings, FIG. 1 illustrates an image reading device 2, such as a copier or a scanner, which is adapted to supply a document or sheet 4 from a stack of sheets or documents 6 into a document travel path 8. Image reading device 2 includes a sheet feeder 14 which can be selectively actuated or engaged by way of a motor and clutch. A separation roller assembly 26 can be utilized to separate the uppermost sheet from the stack in a known manner. Therefore, during operation, sheet feeder 14 in combination with separation roller 26 are operable to transport an uppermost sheet 4 from stack of sheets 6 to document travel path 8 for processing within image device 2. An example of an image reading device, a sheet feeder and a separation roller which can be utilized within the context of the present invention is illustrated in co-pending application Ser. No. 08/825,037 now U.S. Pat. No. 5,921,539.

The present invention provides for a system and method for increasing document throughput rates by, for example, decreasing the length of the gap between documents. In the present invention, a controller in the form of a computer or processor and a small computer system interface (SCSI) 20 is operationally associated with image reading device 2. Controller 20 provides a start command signal to image reading device 2 and sheet feeder 14 so as to proceed with feeding uppermost sheet 4 into document travel path 8. As an example, controller 20 can provide a signal to a motor or clutch associated with sheet feeder 14 to actuate or engage sheet feeder 14. When first document or sheet 4 enters document travel path 8, it's lead edge breaks an automatic document feeder (ADF) sensor 114. ADF sensor 114 is the first sensor to be broken upon first document 4 entering image reading device 2. At this point, a timer 25 associated with controller 20 is started. Timer 25 will determine how long first document 4 is. When the lead edge of first document 4 breaks a document tracking (DTS) sensor 116 downstream of (ADF) sensor 114, sheet feeder 14 is turned off or disengaged. When a trail edge of first document 4 is at ADF sensor 114, sheet feeder 14 is engaged, timer 25 measuring a length of document 4 is stopped, and, the length of document 4 and a overlength threshold are calculated. The overlength threshold is based on the measured length of first document 4 and will be used as a comparison basis for subsequently fed documents. In the preferred embodiment, the overlength threshold is based on the measured length of first document 4 plus a constant which is approximately equal to a difference between the length of a standard document and a lower limit of a long document. The first document 4 will be the only document that is measured in this manner. When a lead edge of a second or subsequent document is at ADF sensor 114, an overlength timer 27 based on the overlength threshold is started. The second document lead edge then reaches DTS sensor 116, sheet feeder 14 is disengaged and a sheet feeder timer 29 (for example, feeder clutch timer) which can be a clutch timer is started. Within the context of the present invention, sheet feeder timer or feeder clutch timer is based on the standard page length and the desired gap between documents. At this point, there are three situations which can occur: the second or subsequent document can be the same length as the first document (a normal case); the second document can be longer than the first document; or the second document can be shorter than the first document. It is noted that at the start up of image reading device 2, controller 20 controls image reading device 2 to feed documents in a fixed gap mode.

A summary of what occurs in the above-noted three situations within the process of the present invention is as follows. First, if a second or subsequent document that is fed into image reading device 2 is the same length as first document 4, the next event to occur is that sheet feeder timer 29 associated with a clutch of sheet feeder 14 to time the engagement and disengagement of sheet feeder 14 expires so as to engage sheet feeder 14. This brings a third document into the system, and a trail edge of the second document will be detected by ADF sensor 114. This will thereby cancel overlength timer 27.

In a situation where the second or subsequent document is longer than first document 4, sheet feeder timer 29 will expire and then overlength timer 27 will expire. Sheet feeder 14 will be disengaged and a fixed gap mode of the image reading device will be the disabled. As noted above, image reading device 2 based on a signal from controller 20 will normally run in a fixed gap mode.

However, when the second document is longer than the first document, the fixed gap mode will be disabled and not used until a new command from controller 20 is issued. When the second document trail edge is detected by ADF 114, sheet feeder 14 will be engaged, bringing the third document into document path 8. In this situation the system reverts to the normal feeding mode no longer using the fixed gap algorithm.

In a situation that the second document is shorter than the first document, the second document's trail edge will arrive at ADF sensor 114 before feeder clutch timer 29 or overlength timer 27 expires. When this event occurs, both feeder clutch timer 29 and overlength timer 27 are cancelled and sheet feeder 114 will be engaged, bringing the third document into the system. When this situation occurs, there is no degradation in performance.

The above cycle is repeated comparing each new document to the first document that entered the system, until there is a system error or the scanner is stopped.

Figure 2A:
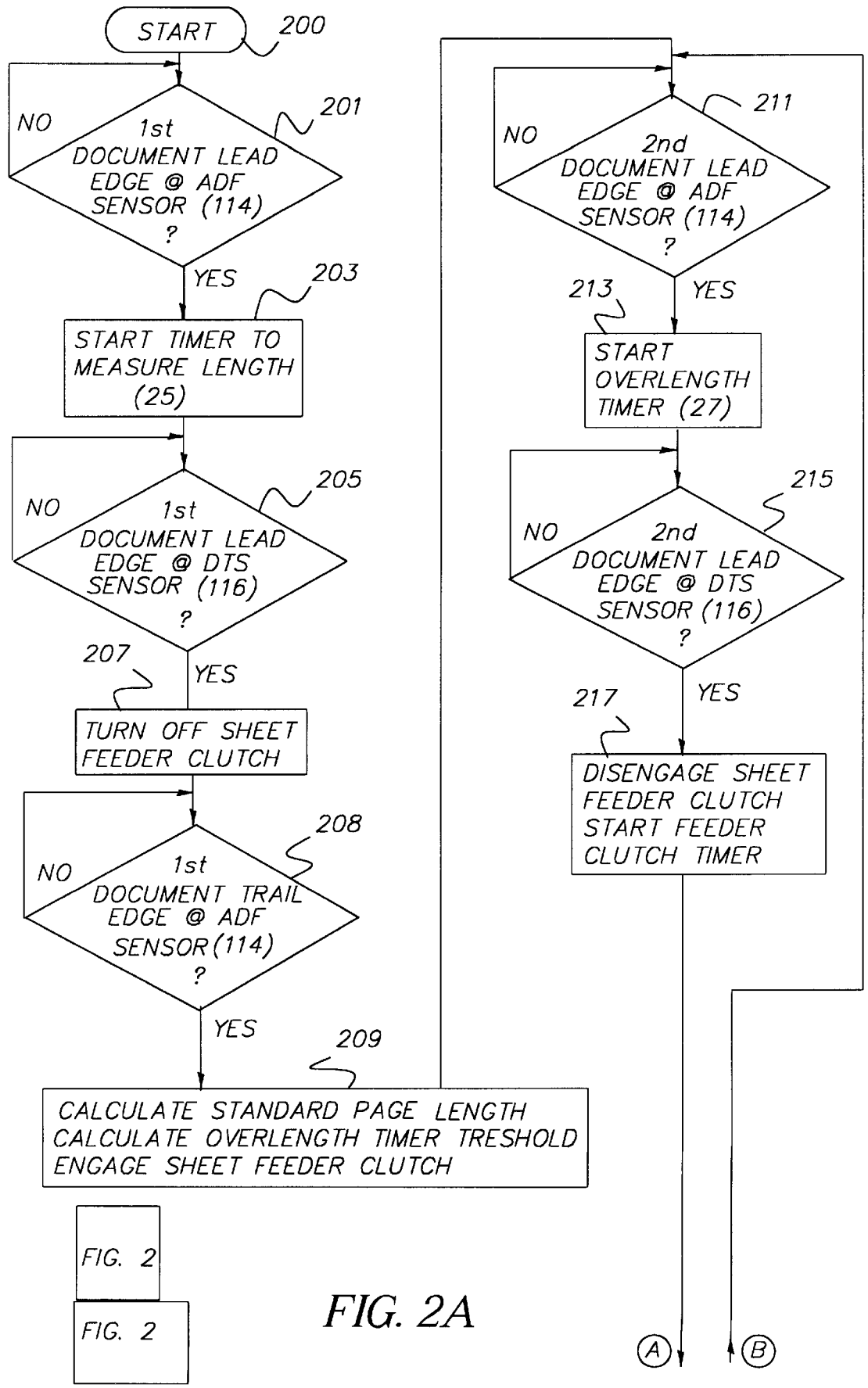
FIGS. 2a and 2b illustrate a flow chart which schematically shows the process of the present invention.
Figure 2B:
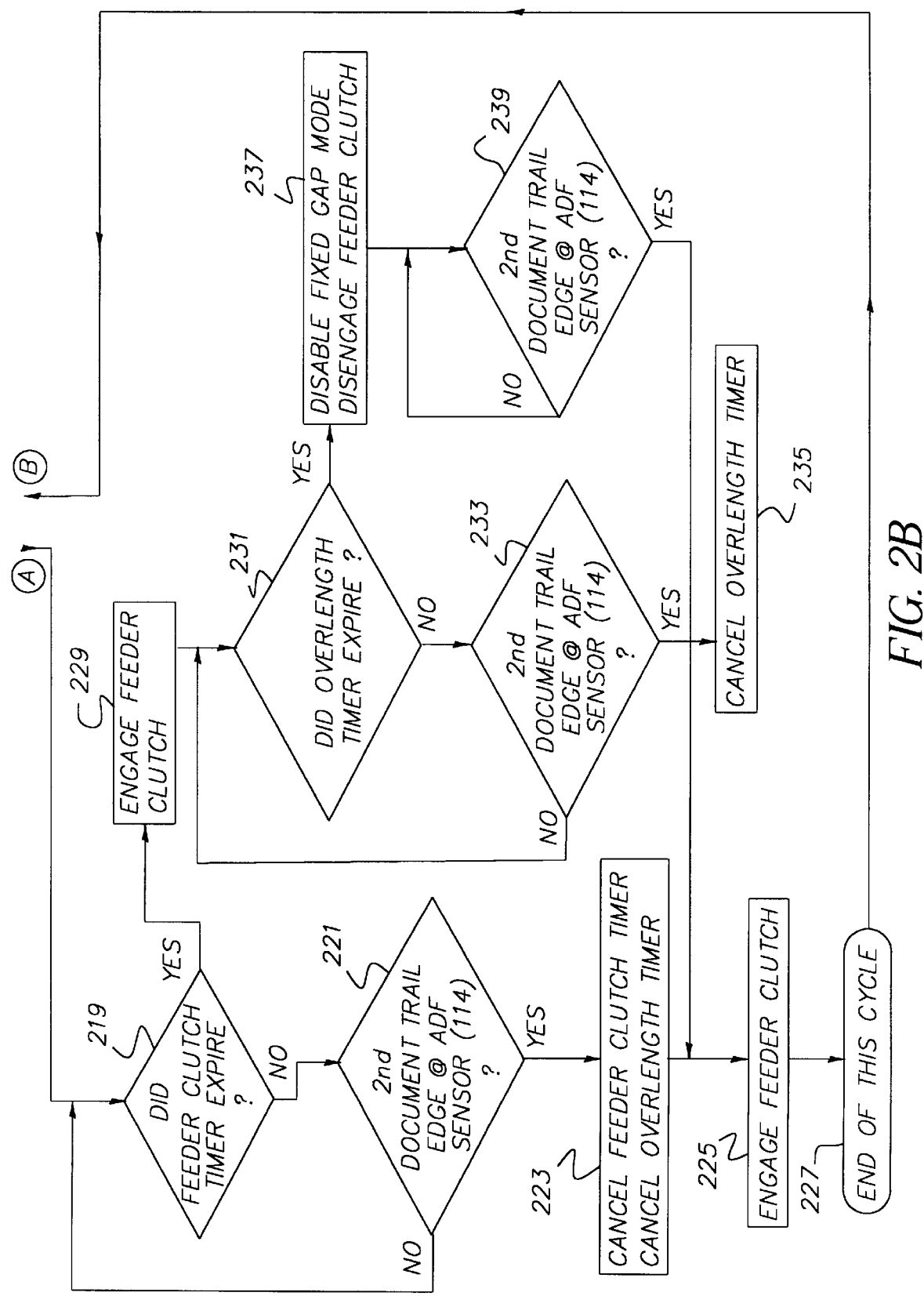

Referring to FIGS. 2a–2b, these figures illustrate a flow chart which describes the process of the present invention in detail, as controlled by controller 20. As illustrated in FIG. 2, at a start setting 200, a fixed gap mode for image reading device 2 is enabled. At step 201, it is determined if a lead edge of first document 4 is at ADF sensor 114. If yes, the process proceeds to step 203 where timer 25 is started to measure the length of first document 4. At step 205, a determination is made if the first document lead edge is at DTS sensor 116. If yes, the system proceeds to step 207 which turns off sheet feeder 14 by, for example, turning off a feeder clutch for sheet feeder 14. The system then proceeds to step 208 where a determination is made if a trail edge of first document 4 is at ADF sensor 114. If the answer to step 208 is yes, the system proceeds to step 209, where a standard page length of first document 4 is calculated, an overlength threshold based on overlength timer 27 and the measured standard page length of first document is calculated, and sheet feeder 14 is engaged by, for example, engaging a feeder clutch for sheet feeder 14.

With the engagement of sheet feeder 14, a second or subsequent document is introduced into document path 8. In step 211, it is determined if the lead edge of the second document is at ADF sensor 114. If the answer to step 211 is yes, overlength timer 27 is started (step 113). The system then proceeds to step 215 where it is determined if the lead edge of the second document is at DTS sensor 116. If the answer to step 215 is yes, the feeder clutch for sheet feeder 14 and thereby sheet feeder 14 is disengaged, and sheet feeder timer or feeder clutch timer 29 for sheet feeder 14 is started.

The system then proceeds to step 219 where a determination is made if feeder clutch timer 29 has expired. If the second or subsequent document which follows first document 4 is shorter than first document 4, the answer to step 219 will be no, and the system proceeds to step 221, where it is determined if a trail edge of the second document has reached ADF sensor 114. In the case of a second or subsequent document which is shorter than first document 4, the answer to step 221 would be yes, and thereafter, the system proceeds to step 223, where a signal is given by controller 20 to cancel feeder clutch timer 29 and overlength timer 27. The system then proceeds to step 225 where an instruction is given to engage sheet feeder 14, and thereafter, step 227 for the end of the cycle. As noted in FIGS. 2a, 2b, the cycle will then repeat for subsequent documents.

If the determination in step 221 is that the second document trail edge has not reached ADF sensor 114, then the second document is longer than first document 4. The answer to step 221 will then be no, and the system will go back to step 219. In the situation where the second or subsequent document is longer than first document 4, or is the same size as first document 4, the answer to step 219 will be yes. The system will then proceed to step 229 where an instruction is given to engage sheet feeder 14 by engaging the feeder clutch for sheet feeder 14. The system thereafter proceeds to step 231 where it is determined if overlength timer 27 has expired. In a situation where the second or subsequent document is of the same size as the first document, the answer to step 231 will be no, and the system will proceed to step 233 where a determination is made if the trail edge of the second document is at ADF sensor 114. Again, if the second document is the same size as the first document, the answer to step 233 will be yes, and an instruction will be given to cancel overlength timer 27, proceed to the end of the cycle 227 step and repeat the cycle for subsequent documents.

If at step 233 it is determined that the trail edge of the second document is not at ADF sensor 114, then the second or subsequent document is longer than the first document and the system proceeds back to step 231. In step 231, it is determined whether overlength timer 27 has expired. For a second or subsequent document which is longer than first document 4, the answer to step 231 would be yes and the system proceeds to disable the fix gap mode set in step 200 (step 237). The system further proceeds to disengage sheet feeder 14 (step 237), and proceeds to step 239 where a determination is made whether the second document trail edge is at ADF sensor 114. When the answer to step 239 is yes, the system proceeds to step 225 where sheet feeder 14 is again engaged, and then proceeds to step 227 to end the cycle. The system will then repeat the cycle again for subsequent documents.

Therefore, the cycle will be repeated for each new document so as to compare every new document to the first document, and based on the comparison, controller 20 disables the fix gap mode, engages or disengages the above-noted timers and engages or disengages the sheet feeder.

The invention has been described in detail with particular reference to certain preferred embodiments thereof, but it will be understood that variations and modifications can be effected within the spirit and scope of the invention.

What is claimed is:

1. An image reading device comprising:
   a sheet feeder for feeding a document to be read into a document travel path;
   a feeder sensor located in said document travel path which senses a lead edge and a trail edge of a first document in said travel path to determine a length of said first document; and
   a controller associated with at least one of said sheet feeder and said feeder sensor, said controller controlling an engagement and disengagement of said sheet feeder based on a length of subsequent documents introduced into said document travel path with respect to said first document.

2. An image reading device according to claim 1, wherein said controller is adapted to control said sheet feeder so as to feed documents in a fixed gap mode and to cancel said fixed gap mode when a subsequent document is longer than said first document.

3. A sheet feeding method comprising the steps of:
   feeding a first sheet into a document travel path of an image reading device;
   sensing a leading edge and a trailing edge of said first sheet;
   determining a length of said first sheet based on said step of sensing the leading and trailing edges of said first sheet; and
   controlling a feeding of subsequent sheets based on a length of the subsequent sheets with respect to the length of said first sheet.

4. A method according to claim 3, comprising the further steps of:
   feeding said first sheet and said subsequent sheets in a fixed gap mode; and
   canceling said fixed gap mode when a length of a subsequent sheet is greater than said first sheet.

5. A sheet feeding method comprising the steps of:
   feeding a first sheet by a sheet feeder into a document travel path of an image reading device;
   sensing a leading edge of said first sheet by a first sensor;
   sensing a leading edge of said first sheet downstream of said first sensor by a second sensor and disengaging said sheet feeder in response thereto;
   engaging said sheet feeder and calculating a length of said first sheet when a trailing edge of said first sheet is sensed by said first sensor, such that a length of said first sheet is used as a basis for an overlength threshold for subsequent sheets;
   feeding a second sheet by said sheet feeder into said document travel path and starting a sheet overlength timer based on said overlength threshold when a leading edge of said second sheet is sensed by said first sensor, said second sheet being fed in a fixed gap mode in which a fixed gap is provided between subsequently fed sheets;
   disengaging said sheet feeder and starting a sheet feeder timer when said leading edge of said second sheet reaches said second sensor;
   determining if said sheet feeder timer has expired, such that if said sheet feeder timer has expired, said second sheet is longer or of the same length as said first sheet, and said method comprises the further step of engaging said sheet feeder; and
   determining if said overlength timer has expired, such that if said overlength timer has expired, said second sheet is longer than said first sheet, and said method comprises the further steps of disabling said fixed gap mode, disengaging said sheet feeder, and engaging said sheet feeder when a trailing edge of said second document is sensed by said first sensor.

6. A method according to claim 5, wherein if said step of determining if said sheet feeder timer has expired determines that the sheet feeder timer has not expired, said second sheet is shorter than said first sheet and said method comprises the steps of:
   canceling the sheet feeder timer and the overlength timer when the trailing edge of said second document is sensed by said first sensor; and
   engaging said sheet feeder.

7. A method according to claim 5, wherein if said step of determining if said overlength timer has expired determines that the overlength timer has not expired, said second sheet is the same length as said first sheet and said method comprises the step of:
   canceling the overlength timer when the trailing edge of said second document is sensed by said first sensor.

* * * * *